United States Patent [19]
Voss

[11] Patent Number: 5,396,924
[45] Date of Patent: Mar. 14, 1995

[54] PRESSURE LIMITING VALVE WITH REPLACEMENT CONTROL VALVE

[75] Inventor: Richard Voss, Schwerte, Germany

[73] Assignee: Richard Voss Grubenausbau GmbH, Schwerte, Germany

[21] Appl. No.: 207,063

[22] Filed: Mar. 8, 1994

[30] Foreign Application Priority Data

Apr. 10, 1993 [DE] Germany .......... 43 11 862.3

[51] Int. Cl.$^6$ .......................... G05D 16/10
[52] U.S. Cl. .................................. 137/491
[58] Field of Search .................. 137/489, 491, 494

[56] References Cited

U.S. PATENT DOCUMENTS

| | | | |
|---|---|---|---|
| 2,333,522 | 11/1943 | Clifton | 137/491 |
| 2,625,174 | 1/1953 | Forde | 137/491 |
| 3,174,410 | 3/1965 | Booth | 137/491 X |
| 3,613,716 | 10/1971 | Hoheisel | 137/491 |
| 4,135,541 | 1/1979 | Lorimor | 137/491 X |
| 4,597,410 | 7/1986 | Wilke | 137/491 |
| 5,168,895 | 12/1992 | Voss | 137/494 |

FOREIGN PATENT DOCUMENTS

| | | |
|---|---|---|
| 1909338 | 7/1978 | Germany . |
| 3314837 | 12/1983 | Germany . |
| 2830891 | 1/1986 | Germany . |
| 3922894 | 2/1991 | Germany . |
| 3929094 | 4/1991 | Germany . |

OTHER PUBLICATIONS

Exner et al., Grundlagen und Komponenten der Fluidtechnik Hydraulik (The Foundation and Components of the Fluid Technology Hydraulics), Der Hidraulik Trainer, Band 1 pp. 216–217. (undated).

*Primary Examiner*—Robert G. Nilson
*Attorney, Agent, or Firm*—James Creighton Wray

[57] ABSTRACT

A pressure limiting valve with high flow rates, but in particular with a good adaptability to the respective conditions, is constructed so that the control piston and the valve piston are coordinated with separate valve cases, whereby these valve cases are connected to each other by way of a plug-in fitting which can be screwed into the valve case of the valve piston and has on the opposite side a standardized plug connection. In the center of this plug-in fitting is provided a center bore, so that the plug-in fitting which has a corresponding opening or blind hole on both sides permits the pressure medium to flow through. The blind hole in the valve piston itself is again connected via a through-bore to the compensation chamber on the opposite side, whereby the diameter of this through-bore is smaller than that of the blind hole of the control piston.

9 Claims, 2 Drawing Sheets

PRESSURE LIMITING VALVE WITH REPLACEMENT CONTROL VALVE

BACKGROUND OF THE INVENTION

The invention relates to a pressure limiting valve with control and valve pistons which move separately against a valve spring or a regulating spring, whereby the valve piston responds by exposing the discharge openings, after the control piston with its blind hole, which is larger than the through-bore, has responded first and has thus enabled the valve piston with its significantly larger diameter to open against the pressure of the regulating spring and of the pressure medium present in the compensation chamber.

Pressure limiting valves are used in particular in underground mining for protecting the hydraulic support from sudden overload, i.e. particularly rock bursts. German Offenlegungsschrift 28 30 891 discloses a pressure limiting valve wherein overpressures in the hydraulic system are reduced by way of a valve spring arranged between screw plug and valve piston. To the valve plate or spring plate is molded a conical or spherical closure element which is lifted from the valve seat if an overload occurs. Onto the piston is molded a damping cylinder which limits the flow through-opening. The closing safety of these known pressure limiting valves is insufficient. In addition, a correct design of the spring is very difficult, although it is the precondition for a safe response of pressure limiting valves. German Offenlegungsschrift 33 14 837, German Offenlegungsschrift 39 22 894, and German Offenlegungsschrift 39 22 094 disclose pressure limiting valves permitting a flow volume of approximately 1,000 liters per minute, whereby these valves have distinctly small dimensions. This is achieved in that the valve piston is constructed as a pipe sleeve which works together with a control piston in such a way that both can be moved together as a structural unit inside the internal bore of the valve case. The known control piston has a blind hole and radial bores through which the pressure medium is able to flow into the spring chamber when the valve responds. The necessary differential surfaces are realized by way of the stepped control piston or the different diameters of control piston and valve piston. The disadvantage in these pressure limiting valves consists of the closing values which are still inadequate, whereby in particular a reclosing of the valve occurs and thus results in a fluttering of the valve piston, since both pistons must move together. The valve spring which is used must be relatively large and long, thus necessitating a more expensive construction for such pressure limiting valves. But the disadvantage in all pressure limiting valves is primarily that, due to the predefined construction, they have a specific output which cannot be changed as such.

SUMMARY OF THE INVENTION

The invention is based on the task of creating an accurately responding pressure limiting valve with adjustable specific output.

According to the invention, this task is solved in that the control piston and the valve piston are coordinated with separate valve cases which are connected with each other by way of a plug-in fitting which can be screwed into the valve case of the valve piston and has on the opposite side a standardized plug connection and a center bore, and that the blind hole in the valve piston is connected by way of a through-bore to a compensation chamber on the opposite side of the valve piston, whereby the diameter of this through-bore is smaller than that of the blind hole of the control piston.

In such a pressure limiting valve, first the control valve with the somewhat larger blind hole opens, whereby the pressure fluid passes through the through-bore into the compensation chamber and from there into the blind hole. In the case of an increase in volume or existing pressure, the valve piston which has a significantly larger diameter also opens and thus exposes the discharge bores, so that the hazardous pressure increase can be reduced rapidly, since hydraulic fluid is discharged. Since the valve piston must open against the force of the spring and the opening cross-sections have been chosen accordingly, a precise opening and closing of the entire system is ensured. A fluttering or even premature closing of the valve piston cannot occur, since the valve piston does not open against the external pressure of approximately 1 bar, but rather opens against the pressure of the regulating spring and the medium present in the compensation chamber. In addition, the control valve can be replaced without difficulties, i.e. by way of the easily operated yet safely closing plug connection. In this manner, the specific output can be adjusted to the actual application case. It is furthermore possible to change the characteristic line of the valve by replacing the control valves, and the response point of the large valve is varied depending on the changing dynamic pressure according to the control valve design. This creates a very versatile pressure limiting valve which is characterized by variable through-put and additionally can be modified in several important aspects.

According to one useful design of the invention, it has been provided that the valve case holding the control piston is equipped with a piston guide which has a plug end constructed so as to correspond to the standardized plug connection. This makes it possible to use the principally known plug connection, whereby standard pressure limiting valves which are here used as control valves in any case have such connections used in the standard coupling of hydraulic lines and hydraulic consumers.

It has already been pointed out that between valve piston and compensation chamber a through-bore is located whose diameter is smaller than that of the blind hole of the control piston. In order to be able to vary the response point of the valve, it may be advantageous that the valve piston has a through-bore to the compensation chamber which has a variable opening width. This opening width hereby can be varied practically in the easiest and most practical manner if the wall of the through-bore has a thread into which a corresponding sleeve with a different width through which the opening width is changed then can be inserted.

Another useful design of the invention provides that the plug-in fitting has on the side opposite from the standardized plug connection a blind hole which accepts the valve piston, whereby the center bore connects the blind hole and the standardized plug connection or corresponding opening on the opposite side in the plug-in fitting. The opening width of the center bore is hereby larger than that of the blind hole of the control piston, simply in order to avoid a mutual influencing here and to specify perfect in-flow. It is advantageous that here the plug-in fitting with its blind hole holds the valve springs which is able to act on the valve piston accordingly. As already said, the center bore ensures that the hydraulic fluid penetrating from the through-bore into the compensation chamber is able to also act on the control piston mounted on the opposite side of the plug-in fitting.

A simpler and safer screw connection between plug-in fitting and regulating valve can be ensured in that according to the invention the center bore is constructed as a hexagon socket, so that an appropriate screw key can be used to tighten it through the corresponding opening in the plug-in fitting with a suitable tool.

The correct pressure conditions are ensured in that different pressure surfaces must be present; something which is ensured here also in that the blind hole in the plug-in fitting has an internal diameter which is greater than the external diameter of the valve piston and thus supplements the compensation chamber. This ensures a larger diameter in the compensation chamber area than on the opposite side of the valve piston, where the latter is guided at that point exactly in the valve case.

A stream-lined design of the pressure fluid conduit parts is optimized in that the blind hole in the valve piston with the radial bores has a conical bottom, with the through-bore being located in the cone tip. This also makes the production of the blind hole easier, since a suitable tool can be used for the work. It is useful that the opposite bottom which functions as a stop for the regulating spring is also designed accordingly, resulting, among other things, in manufacturing-technological advantages, and which also makes it possible to stabilize the bottom area as a whole without having to specify too long of a through-bore.

The favorable stream-lining is improved yet even more in that the base surface of the blind hole in the plug-in fitting is constructed as a funnel or cone shape that turns into the center bore, so that here also the pressure fluid is guided specifically in the direction of the center bore without influencing the characteristic or efficiency of the regulating spring hereby.

The invention particularly is characterized in that an accurately responding pressure limiting valve is created, which has additional advantages in the form of an adjustable specific output, a correctable response point, and a variable characteristic line. This creates a very versatile pressure limiting valve which is in addition characterized in that it takes advantage of existing pressure limiting valves as a control valve, without increasing dimensions too much. Furthermore, the use of the control valve makes it possible to change the preload of the valve spring already present in the valve, thus providing further adaptability.

Further details and advantages of the subject matter of the invention derive from the following description of the attached drawing which shows a preferred embodiment with the necessary details and components. In the drawing:

DETAILED DESCRIPTION OF THE DRAWINGS

Figure 1:
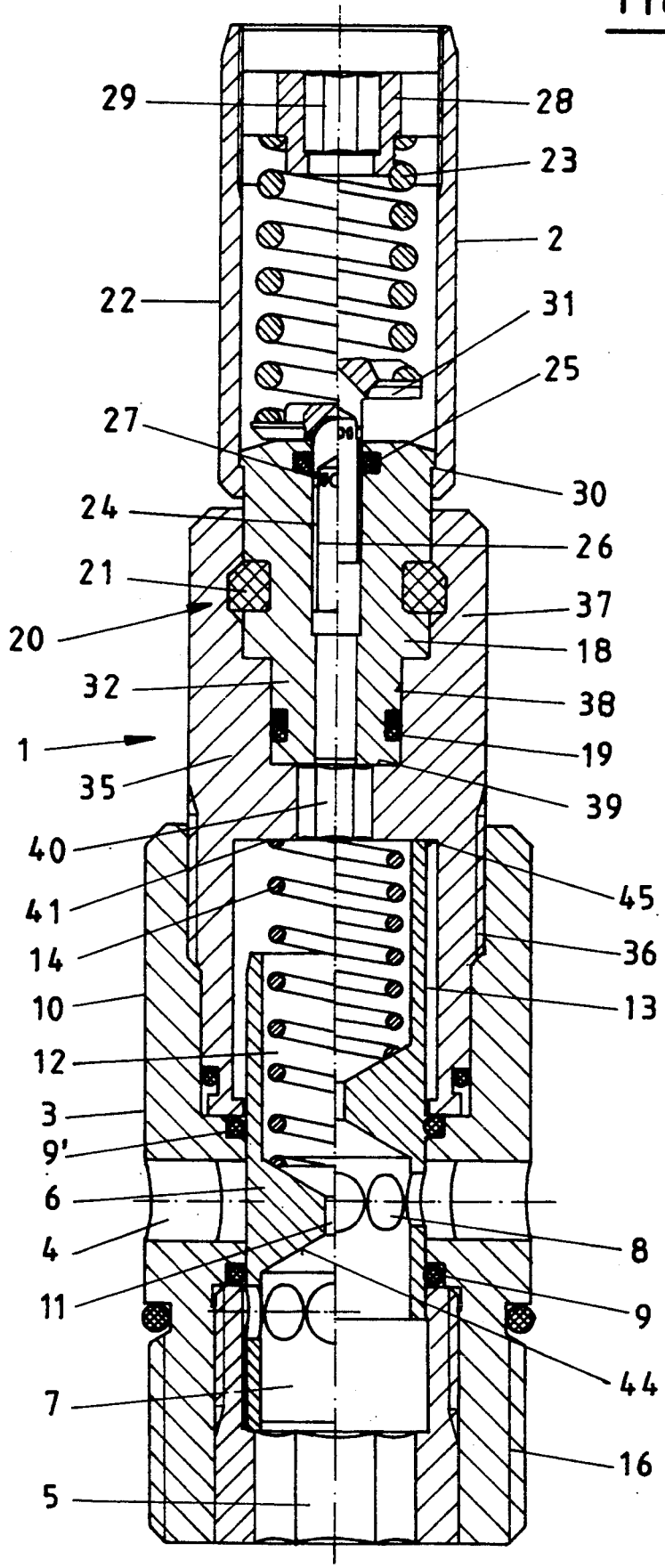
FIG. 1 shows a longitudinal section through the pressure limiting valve.

FIG. 1 shows a longitudinal section of such a pressure limiting valve (1), whereby it is obvious that this new pressure limiting valve consists of two parts, i.e. the control valve (2) and the regulating valve (3). These two valves (2, 3) are connected to each other by way of the plug-in fitting (35)—which will be explained in more detail below—and in this way form a cooperating structural unit.

The pressure limiting valve (1) ensures that the pressure medium flowing in at the entrance bore (5) is not able to pass through the pressure limiting valve (1) when there is a normal load. The valve piston (6) is moved only if an overload occurs, thus exposing the discharge openings (4) through which the pressure medium is able to flow off.

FIG. 1 clearly shows the relatively large entrance bore (5) which turns into a blind hole (7) in the valve piston (6). The blind hole (7) has at its end radial bores (8) which approximately align with the discharge bores (4) when the valve is moved beyond the sealing ring (9) during the valve response.

The regulating valve case (10) with the discharge bores (4) can be screwed into a consumer via a thread (16).

The valve piston (6) is constructed as a sleeve, i.e. on one side with blind hole (7) and on the opposite side with a corresponding spring chamber (12) which simultaneously forms the compensation chamber (13) and also holds the regulating spring (14).

The blind hole (7) on the one side and the spring chamber (12) on the other side are connected to each other by a through-bore (11) with a relatively small opening cross-section, at least one which is smaller than that of the blind hole (26) of the control piston (24).

Figure 2:
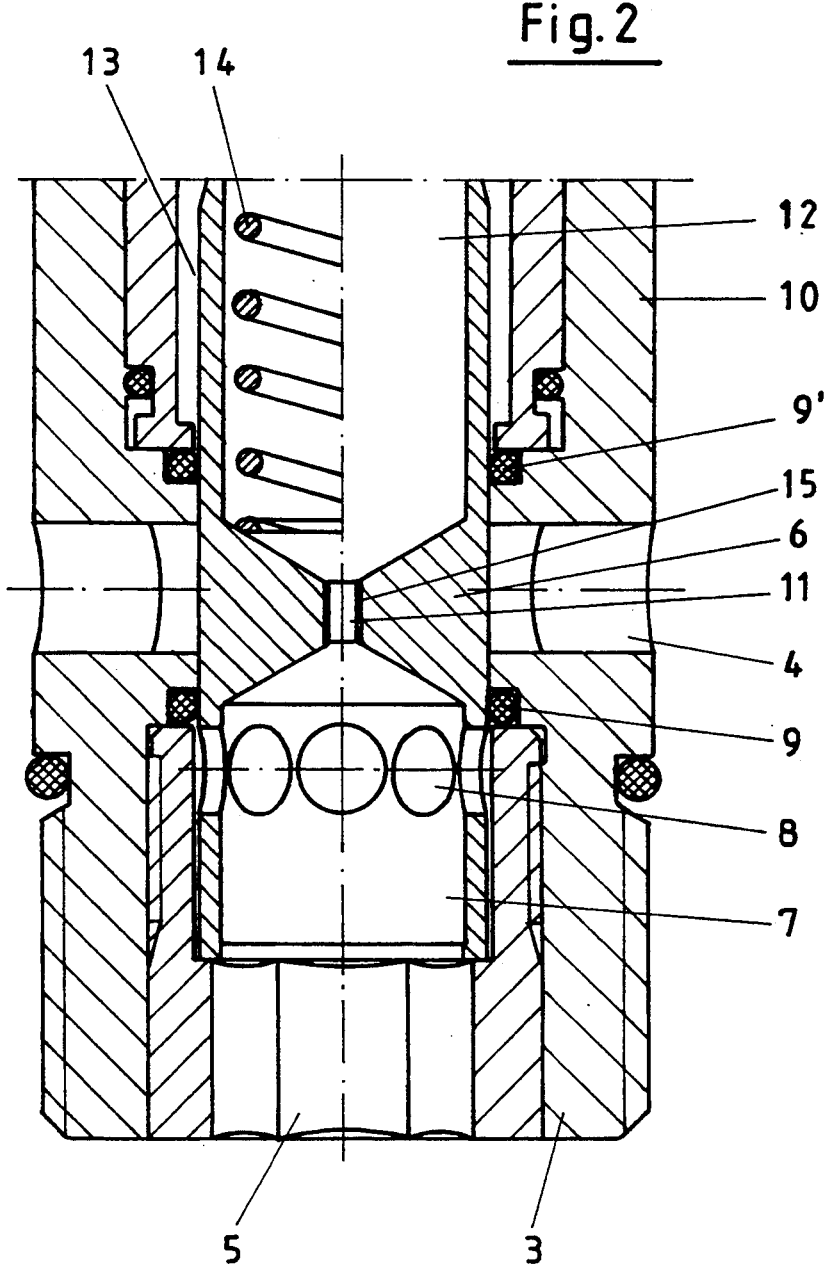
FIG. 2 shows a partial section of the regulating valve area.

FIG. 2 shows especially an enlargement of the valve piston (6), revealing that a thread (16) has been cut into the wall of the through-bore (11). In this way the opening cross-section of the through-bore (11) can be changed, whereby it is possible to also specify the opening cross-section larger from the start, so that the opening cross-section of the through-bore (11) can be widely varied with sleeves of different wall thicknesses.

The valve representing the second pressure limiting valve (1) is the control valve (2). This control valve (2) is on the coupling side to the regulating valve (3) fitted with a piston guide (18), ensuring that an advantageous and accurate connection with the regulating valve (3) is realized by way of the plug-in fitting (35) which was already mentioned. This piston guide (18) is fitted with a sealing ring (19) in order to seal this area and to ensure that the pressure fluid flows through the blind hole (26) into the area of the control piston (24).

The plug connection, designated overall with (20), has corresponding openings and a clamp (21) which is pushed into them. The two parts are effectively coupled with this clamp (21) and are connected to such an extent that this simultaneously also connects the valve case (22) and the valve spring (23). This is because both parts have only a snap connection (30), so that the insertion of the clamp (21) at the same time effectively fastens these two parts which are loosely set on top of each other, Like the valve piston (6), the control piston (24) is also equipped with a blind hole (26) and radial bores (27) attached thereto. These radial bores (27) move past the O-ring (25) when the valve responds, so that the pressure fluid is then able to pass through the blind hole (26) into the valve case (22) or the spring chamber. Hereby the control piston (24) pushes via the spring plate (31) onto the valve spring (23) which is supported on the opposite side on the adjusting screw (28). The forced-in pressure fluid is able to leave the valve chamber again through the valve discharge bore (29).

The plug end (32) of the piston guide (18) is inserted into the plug-in fitting (35). The plug-in fitting (35) itself is equipped with a screw end (36) in order to be able to position the plug-in fitting (35) in the regulating valve case (10) in this manner. This screwing in is facilitated by the fact that the center bore (40) is constructed as a hexagon socket, enabling an easy, effective tightening with a screw key. While the side (37) opposite from the screw end (36) has a standardized plug connection (38) into which the piston guide (18) can be inserted and to which it can be fastened, the plug-in fitting on the side of the screw end (36) has a blind hole (41). Unlike the design (39), this blind hole (41) is not constructed in a stepped manner with standardized plug connection (38), but rather has smooth walls, so that the valve piston (6) is able to slide unhindered. This blind hole (41) has a larger diameter than the external diameter of the valve piston (6), resulting, as already mentioned, in a compensation chamber (13) with an enlarged differential surface.

To achieve a design with favorable flow characteristics, the bottom (44) formed by the blind hole (7) is shaped conically, so that the pressure fluid is fed almost exactly towards the through-bore (11). It is not shown that the base surface (45) in the blind hole (41) may have the same shape, i.e. may form a type of funnel which turns into the center bore (40).

In FIG. 2, the left half shows a closed pressure limiting valve, the right half an open pressure limiting valve. In the open state, the valve piston (6) has driven over the sealing ring (9), and the pressure fluid can flow off via discharge bores (4). But first, it is held by the adjusting spring (14) in the position shown on the left side of FIG. 1, so that the pressure fluid only reaches the compensation chamber (13) through the through-bore (11). Only if a specific pressure has been exceeded, first the control piston (24) opens against the pressure of the valve spring (23), and then the large-capacity valve piston (6) opens. The pistons (6, 24) then take the position shown in the right half of FIG. 1. Once the pressure in the compensation chamber (13) drops again, first the control piston (24) closes, and then the valve piston (6) closes and returns to the position shown in the left half of FIG. 1 and right half of FIG. 2, so that the pressure limiting valve (1) is again closed.

All mentioned features, including those derived only from the drawings, are considered essential to the invention, both individually and in combination.

I claim:

1. Pressure limiting valve with control and valve pistons which move separately against respective valve and regulating springs, whereby the valve piston moves to expose discharge openings, after the control piston having a blind hole larger than a through-bore located in the valve piston moves enabling the valve piston with a significantly larger diameter to open against a pressure of the regulating spring and of a pressure medium present in a compensation chamber, characterized in that the control piston (24) and the valve piston (6) are coordinated with separate valve cases (22, 10) which are connected with each other by way of a plug-in fitting (35) which can be screwed into the valve case (10) of the valve piston (6) and has on the opposite side (37) a standardized plug connection (38) and a center bore (40), and that the blind hole in the valve piston (6) is connected by way of a through-bore (11) to the compensation chamber (13) on the opposite side of the valve piston, whereby the diameter of this through-bore is smaller than that of the blind hole (26) of the control piston (24).

2. Pressure limiting valve as claimed in claim 1, characterized in that the valve case (22) holding the control piston (24) is equipped with a piston guide (18) which has a plug end (32) constructed so as to correspond to the standardized plug connection (38).

3. Pressure limiting valve as claimed in claim 1, characterized in that means are provided that can vary the width of the valve piston through-bore (11).

4. Pressure limiting valve as claimed in claim 3, characterized in that the wall of the through-bore (11) has a thread (15).

5. Pressure limiting valve as claimed in claim 1, characterized in that the connection is a plug-in fitting (35) has on the side (37) opposite from the standardized plug connection (38) a blind hole (41) which accepts the valve piston (6), whereby the center bore (40) connects the blind hole and the standardized plug connection (39) on the opposite side in the plug-in fitting.

6. Pressure limiting valve as claimed in claim 5, characterized in that a blind hole (41) in the plug-in fitting (35) has an internal diameter which is greater than the external diameter of the valve piston (6) for receipt of the valve piston therein.

7. Pressure limiting valve as claimed in claim 1, characterized in that the center bore (40) is constructed as a hexagon socket.

8. Pressure limiting valve as claimed in claim 1, characterized in that the blind hole (7) in the valve piston (6) with the radial bores (8) has a conical bottom (44), with the through-bore (11) being located in the cone tip.

9. Pressure limiting valve as claimed in claim 1, characterized in that a base surface (45) of a blind hole (41) in the plug-in fitting (35) is constructed as a funnel or cone shape that leads into the center bore (40).

* * * * *